March 22, 1955  H. L. RADWAY  2,704,499
AGRICULTURAL SWEEP
Filed Nov. 22, 1950
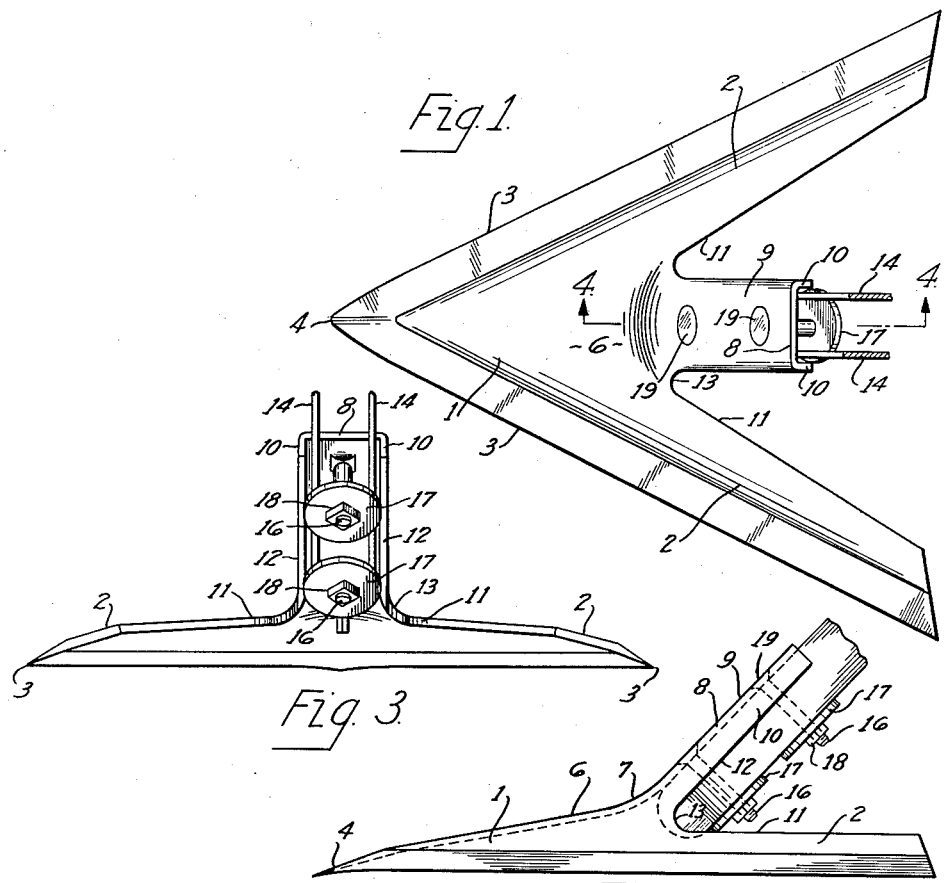
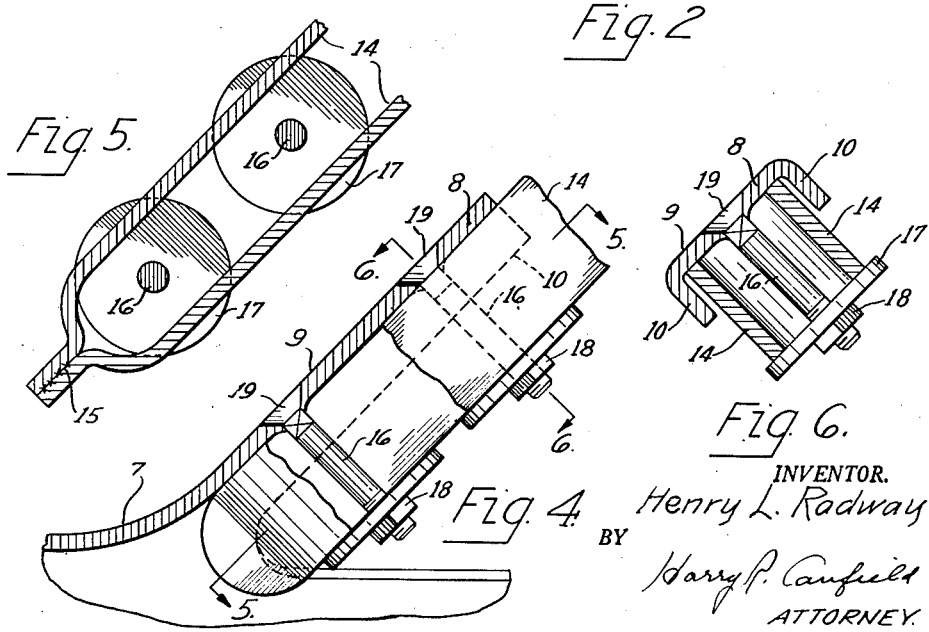
INVENTOR.
Henry L. Radway
BY
Harry P. Canfield
ATTORNEY.

United States Patent Office 2,704,499
Patented Mar. 22, 1955

2,704,499

AGRICULTURAL SWEEP

Henry L. Radway, Cleveland Heights, Ohio, assignor to The Empire Plow Company, Cleveland, Ohio, a corporation of Ohio Application November 22, 1950, Serial No. 197,120

1 Claim. (Cl. 97—204)

This invention relates to agricultural cultivating tools of the general class that are attached to a standard or other tool support of a cultivator implement.

The invention is applicable to various types of cultivating tools, but since perhaps the most important application of the invention is to tools of the wing sweep type, it will be illustrated and described herein as applied to that type of tool.

Wing sweeps comprise generally a forwardly pointed body for attachment to the implement and a pair of blades or wings extending rearwardly from opposite sides of the body, or in some cases, a single blade or wing on one side only.

The body and wings are customarily provided with cutting edges extending rearwardly from the point of the body and along the outer edges of the wings, the wings and the body being shaped so that the cutting edges are in the pattern of a V, the apex of the V being at the point, and in many types of such sweeps the V-pattern edge lies substantially in a plane. In the transverse direction, the wing or blade inclines upwardly and inwardly from the edge.

The present invention is directed to improvements in such sweeps, to adapt them to use on cultivator implements that are drawn by tractors, whereby they are subjected to greater mechanical strains and are propelled at higher forward velocity in the soil, than when, as in older practice, the implement was horse-drawn; and to correlate the improvements with the more recently accepted manner of working the soil for cultivating purposes which will now be briefly described.

Wing sweeps, besides performing the function of cutting off or uprooting weeds also perform the function of breaking up or mulching the surface of the soil to conserve soil moisture, by reducing surface evaporation.

According to the older practice, to mulch the soil for this purpose, it was thought necessary to violently agitate and crumble the soil and turn or roll it over. With prior sweeps, this action on the soil is augmented by the cross sectional shape of the sweep stem.

The stem in such prior sweeps is forwardly convex, curving or sloping rearwardly toward each side from a medial plane.

The soil, as it flows over the main body of the sweep, rearwardly from the point, rises higher and higher on the body; and when it reaches the stem, is abruptly divided thereby and thrown to both sides and rolled or turned over with a plowing action. At the high speeds of tractor implements, this throws the soil laterally outwardly over the wings, and the sweep leaves a furrow in the soil behind the sweep with ridges on both sides.

According to the new conception of mulching and cultivation, this is bad, because it leaves the soil surface so open that detrimental evaporation of underlying moisture takes place through it; and the furrowed and ridged state in which the soil is left, decreases the absorption of rain-fall moisture in the soil, and increases the liability of soil erosion, by rain fall collecting and running off in the furrows; and the furrows and ridges interfere with the action of the sweep on subsequent operations.

The modern conception of sweep cultivation is that evaporation of moisture can be reduced, if a layer of the surface soil be sliced or sheared off from the underlying soil and then replaced with the minimum of agitation, and if the soil surface after passage of the sweep is left level, without furrows and ridges.

The sweep of the present invention contributes to this new concept of cultivation and mulching by having wings that taper in width rearwardly and have only slight angular inclination to the ground, transversely; and by having a stem, the forward face of which is flat or planar.

With a forwardly flat stem, the soil flowing rearwardly over the body of the sweep is not thrown or plowed violently toward the sides but tends to pile up in front of the stem and then overflows at the sides of the stem and falls by gravity downwardly between the stem and the wings, and is thus replaced on the surface between the wings, thus avoiding the plowing of a furrow as referred to.

There are also mechanical disadvantages in the prior forwardly convex stem, particularly when the sweep is bolted by its stem to the foot piece of a tractor drawn implement.

Such a foot piece is transversely flat, as will be described hereinafter, and of less width than the stem, and the concave side of the prior stem is clamped upon it by bolts going through the stem and the foot piece; and unless the stem is drawn against the foot piece with great pressure, it will tend to shift or rotate to one side or the other, due to its concavity and misalign the sweep with its forward direction; and the clamping force of the bolts necessary to prevent this has to be so great that in many cases it cracks the stem, the stem, for obvious reasons, being made of very hard steel.

Also, in such prior sweeps, a special head Plow bolt must be used or a grinding operation has to be performed on the heads of the bolts going through the stem, to conform them to the convex front surface thereof.

It is therefore among the objects of the invention:

To provide an agricultural sweep of the class referred to having an improved mode of operation and construction;

To provide a sweep having a stem that is transversely flat or planar on its forward and rearward sides for the operative and mechanical advantages referred to;

To provide a sweep having wings of rearwardly tapering width, and of slight angular inclination to the ground transversely.

The invention comprises structural features by which these objects are attained, and is fully described in the following description taken in connection with the accompanying drawing in which:

Fig. 1 is a top plan view of a sweep embodying the invention; and showing it attached to the foot piece of a tractor implement;

Fig. 2 is a side elevational view of the embodiment of Fig. 1;

Fig. 3 is a rear elevational view of the embodiment of Fig. 1;

Fig. 4 is a sectional view to an enlarged scale from the plane 4—4 of Fig. 1;

Fig. 5 is a sectional view from the plane 5—5 of Fig. 4; and

Fig. 6 is a sectional view from the plane 6—6 of Fig. 4.

Referring to the drawing, the sweep comprises a forward body 1, of forwardly convex V-form, continuing rearwardly into side wings 2—2. The outside perimeter of the body and wings is formed into a cutting edge 3, all in a common ground plane, except that at the forward point 4 of the body, it is bent downwardly as shown.

The central part or crown of the body is upwardly convex as at 6; and rearwardly the crown 6 curves upwardly as at 7 and continues into a stem that is channel shaped in cross-sections, having a channel web 8 with a flat forward face 9, upwardly and rearwardly inclined; and integral rearwardly extending side flanges 10—10 at approximately right angles to the web 8.

The wings 2—2 taper toward the rear, being as shown, narrower transversely at their rear ends, than at their forward ends, where the inner edge of each wing joins integrally with the edge 12 of the side flange 10—10 of the stem on a curve 13.

The wings are at only a slight inclination, inwardly and upwardly, to the ground level, as best shown in Fig. 3.

It is contemplated that the stem will be bolted to the foot piece of a tractor drawn implement, and such foot piece, as commonly made, comprises a pair of side rails 14—14 of strip steel, parallel and spaced apart as shown, depending from the implement structure (not shown) and downwardly and forwardly inclined as shown. At their lower ends, the side rails 14—14 are bent inwardly toward each other and integrally connected by welding as shown at 15, Fig. 5.

The channel 8 of the stem, is laid on the front of the rails 14—14; with the side flanges 10—10 straddling both rails.

Bolts 16—16 are projected through spaced holes in the channel web 8, and between the rails 14—14 and through large washers 17—17, and nuts 18—18 are threaded on the bolts outwardly of the washers.

The bolt holes in the channel web are first punched square, and then counter sunk on the front face of the web, and the bolts 16—16 are "plow bolts" having square shanks to fit the square holes, and heads that are tapered on their undersides to fit the countersinks, but the heads are flat on their tops, as at 19.

The square shank in the square hole keeps the bolt 16 from turning when the nut 18 is turned as in common practice in agricultural implements; but the bolt head 19 does not have to be a special head Plow bolt nor have a grinding operation performed on it to conform to the forward face 9 of the stem as heretofore, because the face 9 is flat and a flat headed bolt can be used.

The channel form of the stem makes it very stiff and rigid in itself, and by merging its side flanges 10—10 with the wings on a curve as described, it is further enabled to resist bending forces that occur in use.

The whole sweep is press-formed from sheet metal and the web 8 of the channel-form stem will therefore be flat or planar on both its front and back sides. The width between the side flanges 10—10 of the channel is predetermined to straddle opposite sides of the foot piece with small clearance, so that the stem is centrally positioned thereby on the foot piece, and shifting of the sweep laterally on the foot piece is thereby prevented; and the flat back side of the web engaging the foot piece prevents the stem from rotatively shifting on the foot piece (as occurs with rounded concavo-convex stems of the prior art) so excessive tension on the bolts 16—16 to rigidly mount the stem, with the liability of cracking the hard steel thereof, is unnecessary.

The improvement in construction provided by the flat back face of the stem will now be apparent.

The improved mode of operation, due to the flat forward face of the stem, has already been described hereinbefore.

The washers 17 are large enough to overlap and bridge the rails of the foot piece and the bolts go through their center, and a slight resilience of the washer therefore results when the nuts are drawn tight, and this aids the clamping action of the bolts.

I claim:

An agricultural cultivating tool generally of the sweep class for use with a tractor drawn implement; comprising a forwardly pointed body and a pair of wings diverging rearwardly from the body, the body and wings having a continuous V-shaped peripheral cutting edge all in a common plane which is horizontal in the position of use; the body, on a medial position thereof midway between the side edges having a forwardly and rearwardly extending top surface that is substantially rectilinear and inclined upwardly rearwardly at an acute angle to said common plane; an elongated stem on the rear of the body extending generally upwardly rearwardly therefrom; the stem being of elongated channel form and in cross section comprising side flanges and a flange connecting web; the channel side flanges extending rearwardly and the flange connecting web having a planar face forwardly of the flanges; and the planar face being at right angles to a vertical medial plane of the sweep, and being a rectilinear continuation of the said rectilinear top surface of the body and diverging upwardly rearwardly therefrom at an angle to the common horizontal plane substantially twice as large as the said angle of the said top surface; the stem provided with means for attaching it to an implement to be propelled by a tractor and function as a soil surface working sweep, at high tractor speed; whereby the soil sliced off of the ground surface by the sweep and flowing rearwardly in a stream over the said medial top surface of the body at the velocity of the tractor, will first pile up in front of the planar face of the stem and stop flowing rearwardly at said velocity, and then slide off laterally and fall by gravity around the stem and between the wings, whereby the stream is prevented from being divided by the stem and thrown laterally by high velocity over and beyond the wings.

References Cited in the file of this patent

UNITED STATES PATENTS

| Re. 6,887 | Haiman | Feb. 1, 1876 |
| 779,060 | Auker | Jan. 3, 1905 |
| 2,351,388 | Baxter | June 13, 1944 |

FOREIGN PATENTS

| 555 | Australia | of 1926 |